*Fellows & Lyon.*
*Gas Fittings.*
Nº 87,919.  Patented Mar. 16, 1869.
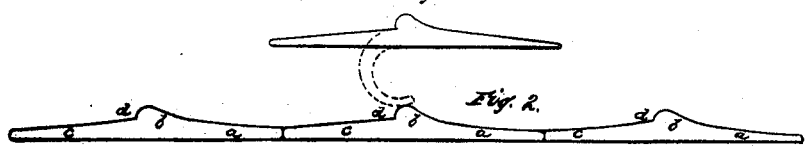
Fig. 1.
Fig. 2.
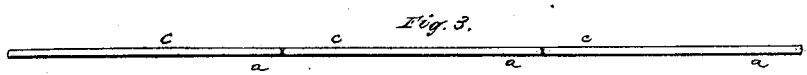
Fig. 3.
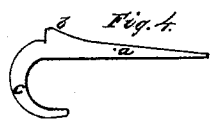
Fig. 4.
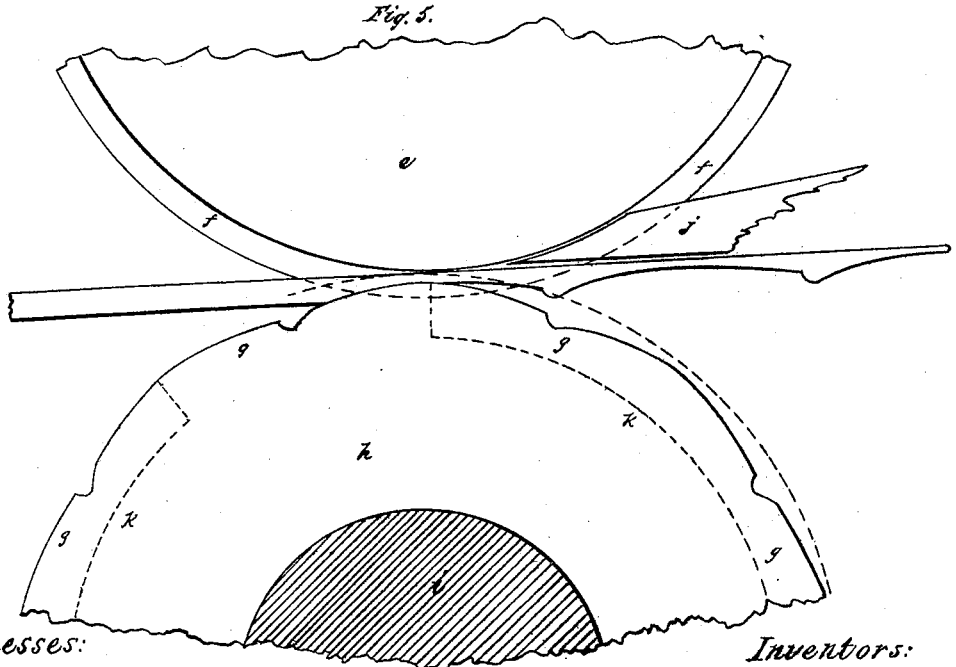
Fig. 5.
Witnesses:  
F. C. Tredwell Jr.  
John A. Duncan
Inventors:  
John Fellows  
James W. Lyon

JOHN FELLOWS AND JAMES W. LYON, OF BROOKLYN, NEW YORK.

Letters Patent No. 87,919, dated March 16, 1869.

IMPROVED ROD OF CONNECTED HOOK-BLANKS FOR GAS-FITTERS' USE.

The Schedule referred to in these Letters Patent and making part of the same.

*To all whom it may concern:*

Be it known that we, JOHN FELLOWS and JAMES W. LYON, of the city of Brooklyn, county of Kings, and State of New York, have invented certain new and useful Improvements in the Manufacture of Blanks for Gas-Fitters' Hooks, and similar hooks, which have a driving-shoulder; and do hereby declare that the following is a full and correct description thereof, reference being had to the annexed drawings, and to the letters of reference thereon.

Heretofore gas-fitters' hooks have been made by forging them, one at a time, from the end of a round or square rod of iron.

An attempt has been made to facilitate the manufacture by bending the hooks from blanks, cut or sheared from sheet or plate-iron; but such cut blanks are unsuitable, for the reason that unless they are made of the softest and finest iron, the material is so much injured by the operation of cutting or shearing of the blank, that it splits and cracks in bending to the form of the hook; and if made of the best iron, the material is much injured, the finished hooks being inferior to the iron from which they are made. Moreover, the waste of material in cutting such blanks from the sheet is, in practice, so great as to counterbalance the saving in forging, by working from the blank; and the hook produced being inferior to a forged hook made from the same quality of iron, the manufacture of hooks in this manner has proved unsuccessful.

In our said improvements we have sought to produce blanks suitable for gas-fitters' hooks, by the operation of rolling, which improves the quality of the iron, instead of injuring it, and is not subject to the great waste of material produced by the shearing-operation.

Our invention consists in a new and useful manufacture of rolled wrought-iron hook-blanks, having the material disposed so as to form the driving-shoulder, and ready to be formed into a gas-fitters' hook, or similar hook, having a driving-shoulder, by the operation of bending, to the desired curve, that part of the blank designed for curve of the hook. Also, in a rolled wrought-iron rod, of hook-blanks, or series of hook-blanks, united by the iron of rod from which they were rolled, substantially as hereinafter described.

Single rolled hook-blanks may be made from a piece of flat rod-iron, of the width, or nearly of the width of the desired blank, at the shoulder, and heated to a proper temperature for rolling, by placing it edgewise in the groove of a grooved roller, and subjecting it therein to the rolling-action of a rotating die, which enters the groove, the groove being of sufficient depth for that purpose, and by reason of the conformation of the surface of said rotating die, the blank is rolled to the desired form.

But for the purpose of greatly cheapening the manufacture, and of putting the blanks in as convenient form for transportation as commercial rod or flat iron, we prefer to roll the blanks from the rod instead of from pieces cut from the rod, the expense of cutting being no greater after the rod is rolled to shape than before, and may be as well done at the time the hooks are bent, especially if machinery be used to bend the hooks, because it is easier to feed a rod to a bending-machine than small pieces.

For the purpose of rolling the rod of blanks, we use, in combination with a grooved roller, a cylindrical rotating die-plate, having a series of dies cut on its periphery, of a form corresponding to the outline of the irregular side of the blank, said series of dies constituting the entire periphery of the die-cylinder.

But to more particularly describe our invention, we will refer to the drawings, of which—

Figure 1 represents the outline of a single rolled hook-blank, the red lines showing the curve of the hook when bent.

Figure 2, a series of blanks, rolled in form of a rod of blanks, separable by cutting at the parts marked $x\ x$.

Figure 3, plan view of straight edge of same.

Figure 4, a hook, and

Figure 5, broken section of grooved roller and rolling-dies, showing operation of rolling blank from rod, the red lines defining a single die, if one be used to roll single blanks.

The blanks are formed with a shank, or tang, $a$, driving-shoulder $b$, and hook-part $c$, which is afterward bent to the desired curve.

In the operation of bending, the driving-shoulder becomes more prominent than in the blank, and may be made more so by flattening the hook-part at $d$.

The blanks are a little thinner at the straight edge than at the irregular edge, owing to the groove of the rollers being slightly bevelled at the sides, for clearance in rolling.

The straight edge may be made rounding or square, as may also the irregular edge, by conforming the shape of the bottom of the groove in the grooved roller and the face of the die to such shape.

The grooved roller $e$ is an ordinary grooved roller, with a groove, $f$, of sufficient depth to take in the rod of iron, and hold it to the rotating swaging-dies $g$, which may be cut on the periphery of a steel ring, or die-plate, $h$, of suitable thickness at its periphery to conform to and roll in the groove of the grooved roller, and secured to a rotating shaft, $i$, by rings and washers, as usual with die-plates used with rolls, or the dies may be made separately, and secured separately in a series, by screws, or other suitable fastenings, the manner of securing the dies forming no part of our invention.

A scraper, $j$, is used to relieve the rolled blank or blanks from the grooved roll.

The red lines $k\ k$ define a single die, for rolling single blanks from short pieces.

We claim, as a new article of manufacture—

The rolled wrought-iron rod of hook-blanks, consisting of a series of connected hook-blanks, each of the contour and disposition of metal, substantially as described.

JOHN FELLOWS.
JAMES W. LYON.

Witnesses:
F. C. TREADWELL, Jr.,
JOHN A. DUNCAN.